April 20, 1954 R. R. BIGLER 2,676,275

PIEZOELECTRIC CRYSTAL APPARATUS

Filed Feb. 2, 1953

INVENTOR.
ROBERT R. BIGLER

BY Charles H. Brown

ATTORNEY

Patented Apr. 20, 1954

2,676,275

UNITED STATES PATENT OFFICE 2,676,275

PIEZOELECTRIC CRYSTAL APPARATUS

Robert R. Bigler, Erlton, N. J., assignor to Radio Corporation of America, a corporation of Delaware Application February 2, 1953, Serial No. 334,471

9 Claims. (Cl. 310—8.9)

This invention relates to piezoelectric crystal apparatus and particularly to the art of mounting piezoelectric crystals.

An object of the invention is to provide a new and improved piezoelectric crystal assembly which is inexpensive, easy to assemble, rugged, hermetically sealed and wherein the crystal is free to oscillate with high orders of activity and frequency stability.

Another object is to provide an improved shock and vibration resistant mounting for a plated piezoelectric quartz crystal.

It has been the practice in the art to deposit metallic electrodes on the faces of AT-cut piezoelectric crystals and mount the crystals in a holder wherein electrical contact with the electrodes is made by depositing conductive strips from the electrodes to supporting posts, or by employing a conductive metal paste which, when fired, provides a continuous metallic connection between the electrodes and supporting posts. An AT-cut crystal ground to oscillate at a frequency below about 1500 kilocycles has a thickness such that the mass of the crystal often causes the contacts to be broken when the unit is dropped or otherwise subjected to high accelerations.

The foregoing difficulty is overcome by the crystal holder and mounting of the present invention. According to this invention, a base of insulating material, such as ceramic or glass, is provided with two contact prongs extending from one side of the base for removable insertion into a socket. Grooved conductive posts extend from the prongs on the other side of the base. A crystal wafer is inserted between the posts with opposite peripheral edges in the grooves in the posts. A cushion strip of material such as "Teflon" is positioned between the base and the crystal and a strap of insulating material such as "Teflon" is bridged across the ends of the posts farthest removed from the base. The crystal wafer is thus engaged at four points around its periphery. An electrode on one face of the crystal wafer extends to one peripheral edge which is contacted by one of the posts and the electrode on the other face of the crystal wafer extends to an opposite peripheral edge which is contacted by the other post. According to another form of the invention, the periphery of the crystal wafer is engaged at one point by the strap of insulating material and at two other points about 100 degrees therefrom by the grooved metallic posts. This provides a three-point support for the crystal.

It has been found that crystal assemblies constructed according to the teachings of this invention may be subjected to accelerations in the order of 100 G's without the breaking of internal connections, even though the crystal may shift somewhat in its mount.

For a better understanding of the invention reference is made to the following more detailed description taken in conjunction with the appended drawings, wherein.

Figure 3:
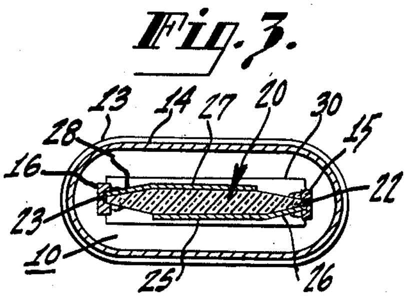
Fig. 3 is a section taken on the line 3—3 of Fig. 1.
Figures 4, 5:
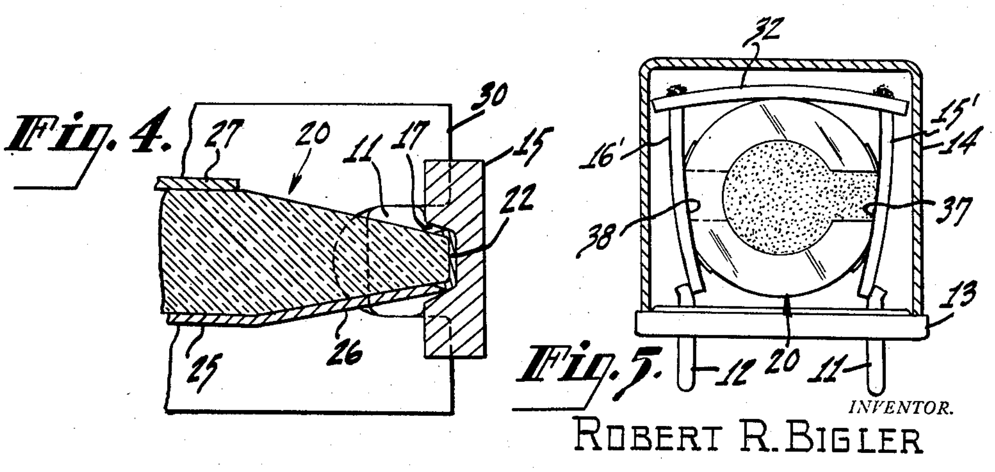
Fig. 4 is an enlarged portion of the section of Fig. 3 showing details whereby electrical contact is made from a crystal electrode to a supporting post.
Fig. 5 is an elevation of another form of the invention.

Referring now to the drawings, wherein the same reference numerals are employed for corresponding parts in the several views, the crystal holder and mounting of the invention comprises an oblong insulating base 10 of glass which is cast around metallic plug prongs 11 and 12 and located within an oblong metallic base rim 13 having a channel to receive the open edge of protective can 14. An alloy known in the trade as "Kovar" is a suitable material for prongs 11 and 12, and for rim 13, when used in conjunction with a base 10 of glass having substantially the same coefficient of expansion. Metallic posts 15 and 16 are secured, as by spot welding, to prongs 11 and 12, respectively. As shown in Figs. 3 and 4, posts 15 and 16 are provided with longitudinally extending grooves 17 and 18, respectively, designed to receive opposite peripheral edges of a crystal wafer generally designated 20. Posts 15 and 16 may be formed by rolling half-hard cold-rolled steel wire to form the cross section shown in Fig. 4. If there is danger of corrosion of posts 15 and 16 prior to completion of the hermetically sealed unit, the material may be given a copper flash and plated with nickel.

Crystal wafer 20 consists of a piezoelectric crystal ground to a thickness appropriate to the desired frequency of oscillation and having tapered peripheral edges. While a round shape as shown is preferred for the crystal, rectangular or oval shapes may be employed, if desired. Opposite peripheral edges of the crystal are painted with a conductive metal paste and fired at a temperature of about 500 degrees centigrade to remove the solvent and binder. The result is to provide conductive strips 22 and 23 intimately bonded to the crystal 20. Silver is a preferred metal in paste form for this application because it results in a metallic coating having relatively high resistance to abrasion. A silver paste including six per cent or more of gold is desirable to retard migration of gold from the electrode described below.

A circular electrode 25 and a conductive strip 26 extending to the peripheral silver strip 22 are thermally evaporated onto one surface of the crystal 20 in a vacuum. Gold is a preferred material for use in forming the electrode 25 and strip 26. A similar electrode 27 and conductive strip 28 extending to silver strip 23 are deposited on the opposite surface of crystal 21. The thickness of gold deposited on the crystal to form electrode 25 and/or electrode 27 is controlled to determine the precise frequency of oscillation of the crystal.

Figure 1:
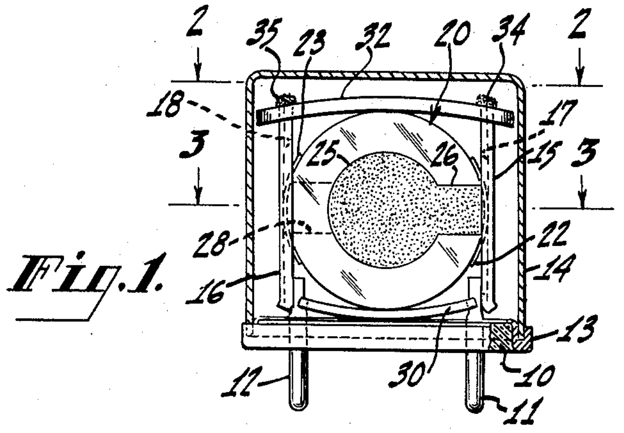
Fig. 1 is an elevation of a crystal assembly constructed according to the teachings of this invention, the protective can being broken away to show interior details.
Figure 2:
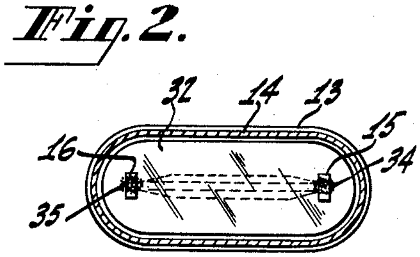
Fig. 2 is a section taken on the line 2—2 of Fig. 1.

An insulating cushion strip 30 is notched at its ends to fit securely between prongs 11 and 12. After the crystal 20 is positioned against cushion strip 30 with opposite peripheral edges of the crystal in the grooves 17 and 18 of posts 15 and 16, respectively, an insulating strap 32 is bridged across the free ends of posts 17 and 18. Strap 32 is provided with apertures to receive the ends of posts 15 and 16, and the strap is held in position by balls of high-temperature solder 34 and 35 formed on the ends of posts 15 and 16. The strap 32 is normally flat, but in the assembly is strained as shown in Fig. 1 to exert a downward force on crystal 20. The apertures in strap 32 are made to be such a distance apart that when engaged with posts 15 and 16, the posts are pulled together, firmly clamping the crystal 20 therebetween. This clamping action is such that positive electrical contact is made from post 15 to silver strip 22, and from post 16 to silver strip 23.

Cushion strip 30 and strap 32 are constructed of a material having good electrical insulation properties and the ability to withstand high temperatures without deterioration. It is necessary that the material withstand high temperatures so that it is not affected by the heat needed to solder can 14 to base rim 13, and the heat needed to form balls of solder 34 and 35 on posts 15 and 16. One material which has been found to be very satisfactory in all respects is tetrafluoroethylene resin which is sold by many fabricators under the trade-mark "Teflon" of E. I. du Pont de Nemours & Co., Inc.

Instead of employing balls of solder 34 and 35 to hold strap 32 in place, the ends of posts 15 and 16 may be crimped over to serve the same purpose.

When crystal 20 is an AT-cut crystal, the conductive strips 26 and 28 are deposited essentially in line with the Z′ axis or the X axis of the crystal. The Z′ axis is a projection of the Z axis and is at ninety degrees with the X axis. The crystal, when mounted in the holder as shown in Fig. 1, is then supported at four points, two of which lie on the Z′ axis and two of which lie on the X axis of the crystal. It has been found that optimum results are obtained when the four mounting points are on the Z′ and X axes or not more than 15 degrees displaced therefrom.

It is apparent that, according to the construction described, the crystal 20 is firmly held at four equally spaced points about its periphery. The crystal is free to oscillate without detrimental damping from the supporting means. Positive electrical contact is made from prong 11 and post 15 to the silver strip 22, gold strip 26 and gold electrode 25. Similarly, positive electrical contact is made from prong 12 and post 16 to silver strip 23, gold strip 28 and gold electrode 27. Even if the crystal 20 shifts slightly as a result of a severe mechanical shock, the electrical contact between the supporting posts and the crystal electrodes is not broken.

In the final step of manufacture, protective can 14 is positioned with its open edge in the groove in base rim 13 and soldered to the base rim 13. A corrosion-inhibiting gas such as dry air or dry nitrogen is introduced through a small hole in the can. The hole is then sealed to provide a hermetically sealed unit.

Fig. 5 shows another embodiment of the invention in which the crystal wafer is mechanically supported at three points around its periphery. The construction differs from that shown in Figs. 1 through 4 in that posts 15′ and 16′ are arranged to engage the periphery of crystal 20 at points 37 and 38 which are not 180 degrees apart and which are below a horizontal line through the center of the crystal. It has been found that the crystal is securely held when posts 15′ and 16′ engage the periphery of crystal 20 at points which are about 100 degrees on both sides from the point on the periphery engaged by insulating strap 32. Electrical contact is made between prongs 11 and 12 and the corresponding electrodes on the crystal in the manner described in connection with Figs. 1 through 4. The insulating cushion 30 of Fig. 1 is eliminated from the embodiment of Fig. 5.

What is claimed is:

1. A crystal assembly comprising an insulating base, two electrically conductive posts extending from a point at or near said base, said posts having longitudinally extending grooves on facing surfaces, a crystal wafer disposed between said posts with opposite peripheral edges in said grooves, and a strap of insulating material secured to the free ends of said posts to urge the posts against said crystal wafer.

2. A crystal assembly comprising an insulating base, two spaced metallic posts extending from said base, said posts having longitudinally extending grooves on facing surfaces, an insulating cushion strip extending between said posts and contiguous with said base, a crystal wafer disposed between said posts with opposite peripheral edges in said grooves, and a strap of insulating material secured to the free ends of said posts to urge the posts against said crystal and to urge said crystal against said cushion strip.

3. A crystal assembly as defined in claim 2 wherein said cushion strip and said strap are constructed of tetrafluoroethylene resin.

4. A piezoelectric crystal assembly comprising an insulating base, contact prongs extending through said base, posts having longitudinal grooves secured to said prongs, a piezoelectric crystal wafer mounted between said posts with opposite peripheral edges disposed in said grooves, and an insulating strap secured to the posts to urge the posts together against the crystal wafer and to urge the crystal wafer against the base.

5. A piezoelectric crystal assembly comprising an insulating base, contact prongs extending through said base, posts having longitudinal grooves welded to said prongs, a piezoelectric crystal wafer having electrodes deposited on opposite faces thereof with contact strips extending to opposite peripheral edges thereof, said crystal wafer being mounted between said posts with opposite peripheral edges disposed in said grooves, and an insulating strap secured to the posts to urge the posts together against the crystal wafer and to urge the crystal wafer against the base.

6. A crystal assembly comprising a circular crystal, a deposited metallic electrode on one face of said crystal extending to one peripheral edge thereof, a deposited metallic electrode on the other face of said crystal extending to the opposite peripheral edge thereof, two substantially parallel grooved metallic posts engaging said opposite peripheral edges in said grooves, and insulating members connecting the ends of said posts to form a substantially square frame engaging said crystal at four equally spaced points around its periphery.

7. A crystal assembly comprising a circular AT-cut crystal having Z' and X axes at right angles with each other, a deposited metallic electrode on one face of said crystal extending to one peripheral edge thereof including one of said axes, a deposited metallic electrode on the other face of said crystal extending to the opposite peripheral edge thereof including the same axis, two substantially parallel grooved metallic posts engaging said opposite peripheral edges of the crystal, and insulating members connecting the ends of said posts to form a substantially square frame engaging said crystal at four equally spaced points around its periphery.

8. A crystal assembly comprising a metallic base rim, two contact prongs, a glass base member fused around said prongs and within said rim to hold the prongs in insulated spaced relationship, two metallic posts welded to said prongs, said posts having longitudinally extending grooves on facing surfaces, an insulating cushion strip extending contiguous with said base between said posts, a crystal disposed between said posts with opposite peripheral edges in said grooves, a deposited metallic electrode on one face of said crystal extending to a peripheral edge contacted by one of said posts, a deposited metallic electrode on the other face of said crystal extending to the opposite peripheral edge contacted by the other of said posts, a strap of insulating material secured to the free ends of said posts to urge the posts against said crystal and to urge said crystal against said cushion strip, and a protective metallic can soldered to said base rim to provide a hermetically sealed crystal unit.

9. A piezoelectric crystal assembly comprising an insulating base, a circular crystal wafer, two metallic grooved posts extending from points on said base which are closer together than the diameter of said crystal wafer, said crystal wafer having peripheral edges engaged between said posts in the grooves therein, and an insulating strap secured to the free ends of said posts to urge the posts together against the crystal wafer.

No references cited.